United States Patent [19]

Williams

[11] 4,064,362

[45] Dec. 20, 1977

[54] HEARING PROTECTOR

[76] Inventor: David Richard Williams, Rte. 2, Box 409-A, Brookings, Oreg. 97415

[21] Appl. No.: 722,683

[22] Filed: Sept. 13, 1976

[51] Int. Cl.² .............................................. H04M 1/19
[52] U.S. Cl. ................................. 179/1 P; 179/182 R; 179/107 FD
[58] Field of Search ........................... 179/1 P; 333/14

[56] References Cited

U.S. PATENT DOCUMENTS

| | | | |
|---|---|---|---|
| 3,306,991 | 2/1967 | Wood | 179/107 R |
| 3,394,226 | 7/1968 | Andrews | 179/1 D |
| 3,952,158 | 4/1976 | Kyle | 179/1 P |
| 3,986,049 | 10/1976 | Campbell et al. | 333/14 X |

Primary Examiner—William C. Cooper

Attorney, Agent, or Firm—Brown & Martin

[57] ABSTRACT

A hearing protector for providing protection from high volume sound waves. The protector is a headset including earmuffs, at least one of which contains a microphone for receiving sound waves and a speaker for transmitting sound waves to the ear of a person wearing the headset. The signal to the speaker is filtered to reduce the amplitude of any frequency components outside of a predetermined audio frequency range. A CMOS integrated circuit is connected as an active voltage sensitive variable resistance element of a control circuit for automatically limiting the volume of the sound waves provided by the speaker, in response to variations in the level of the sound received within the predetermined audio frequency range.

4 Claims, 3 Drawing Figures

HEARING PROTECTOR

BACKGROUND OF THE INVENTION

The present invention is generally directed to hearing protectors and is specifically directed to an earmuff type hearing protector including an electronic circuit for enabling the wearer to hear audio waves at a non-harmful volume level.

It is necessary for persons engaging in activities within high volume sound environments to wear hearing protectors, such as earmuffs, in order to protect their hearing. Hearing protectors of this type have proven to be particularly beneficial to persons working around jet aircraft or shooting on a practice range, for example.

However standard earmuffs that are effective in significantly reducing the volume of ambient sound waves transmitted directly to the wearer's ears from the environment so as to protect the ears from loud harmful noises also usually prevent the wearer from hearing words spoken by another person in his vicinity. One solution to this shortcoming of standard earmuffs was suggested by Ball Corporation, Muncie, Indiana in an advertisement for an "automatic gain controlled hearing protector". Such hearing protector is an earmuff type protector which was described as "an audio instrument which protects hearing and improves voice intelligibility in high noise environments. A microphone senses surrounding sound, filters out potentially harmful frequencies, and passes on only those frequencies pertinent to the human voice range". However, such hearing protector has not been made commercially available notwithstanding such advertisment.

It is the object of the present invention to provide a commercially practical hearing protector of the earmuff type having an electronic circuit for enabling the wearer to hear audio sound waves within a predetermined frequency range and at a non-harmful volume level. In this regard the electronic circuit of the earmuff should include a control circuit of simple and economical construction for automatically limiting the volume of the sound waves produced by the speaker when the level of the signal to the speaker increases.

SUMMARY OF THE INVENTION

The hearing protector of the present invention is an earmuff which includes an electronic circuit.

The electronic circuit includes a microphone for receiving sound waves and producing a microphone output signal in response thereto; an amplifier for amplifying the microphone output signal; an electronic filter for filtering the microphone output signal to reduce the amplitude of frequency components outside of a predetermined audio frequency range; a speaker for producing sound waves in response to the amplified and filtered signal; and a control circuit responsive to the amplified and filtered signal and coupled to the amplifier for automatically limiting the volume of the sound waves produced by the speaker when the level of the amplified and filtered signal increases.

The hearing protector of the present invention is characterized by the control circuit including a voltage sensitive variable resistance element having an input coupled to the output of the amplifier for sensing the level of the amplified and filtered signal and having an output coupled to the microphone output for reducing the level of the received signal when the amplified and filtered signal increases. Preferably the voltage sensitive resistance element is a CMOS integrated circuit constructed for normal use as a NOR gate, but which is connected with its P channel FET's effectively eliminated from the circuit and its N channel FET's having their gates coupled in common to the output of the amplifier and their drains coupled in common to the microphone output, wherein the N channel FET's are connected to operate near their conduction threshold so as to present a variable resistance to circuit ground for the output signal from the microphone, with the variable resistance decreasing as the level of the amplified and filtered signal increases. In effect, the CMOS integrated circuit attenuates the output signal from the microphone in proportion to the level of the amplified and filtered signal.

The use of CMOS integrated circuit as an active voltage sensitive variable resistance element in the control circuit thereby provides a control circuit of simple and economical construction.

DESCRIPTION OF THE PREFERRED EMBODIMENT

The hearing protector is for use in a headset including a pair of earmuffs that are adaptable to fit sufficiently tight over the wearer's ears as to significantly reduce the volume of ambient sound waves transmitted directly to the wearer's ears from the environment.

Figure 1:
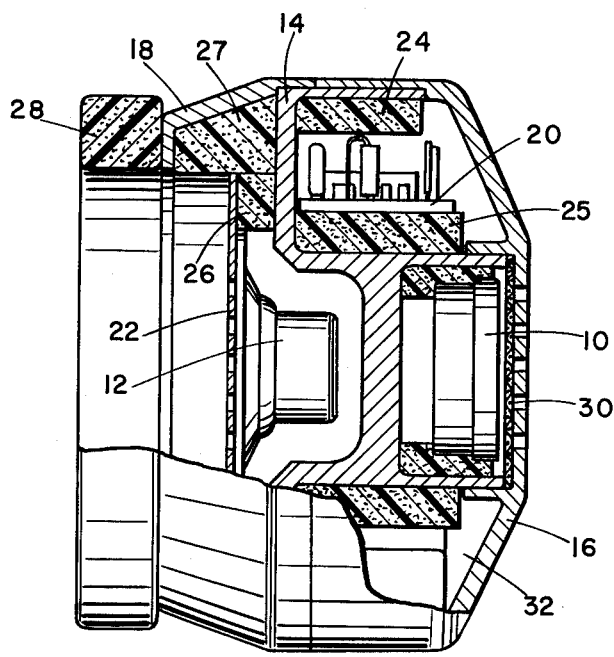
FIG. 1 is a side elevation view partially cut away, of a preferred embodiment of the hearing protector earmuff.

Referring to FIG. 1, each hearing protector earmuff includes a microphone 10 and a speaker 12 within a housing framework 14. The housing framework 14 is contained within an outer dome 16 and an inner dome 18. Also enclosed within the housing framework 14 are a printed circuit board assembly 20, a speaker mounting plate 22, foam isolators elements 24, 25, 26, 27, a cushion seal 28 for contact with the head about the ear, and a moisture screen 30. Batteries (not shown) are positioned in the space 32 adjacent the printed circuit board assembly 20.

Figure 2:
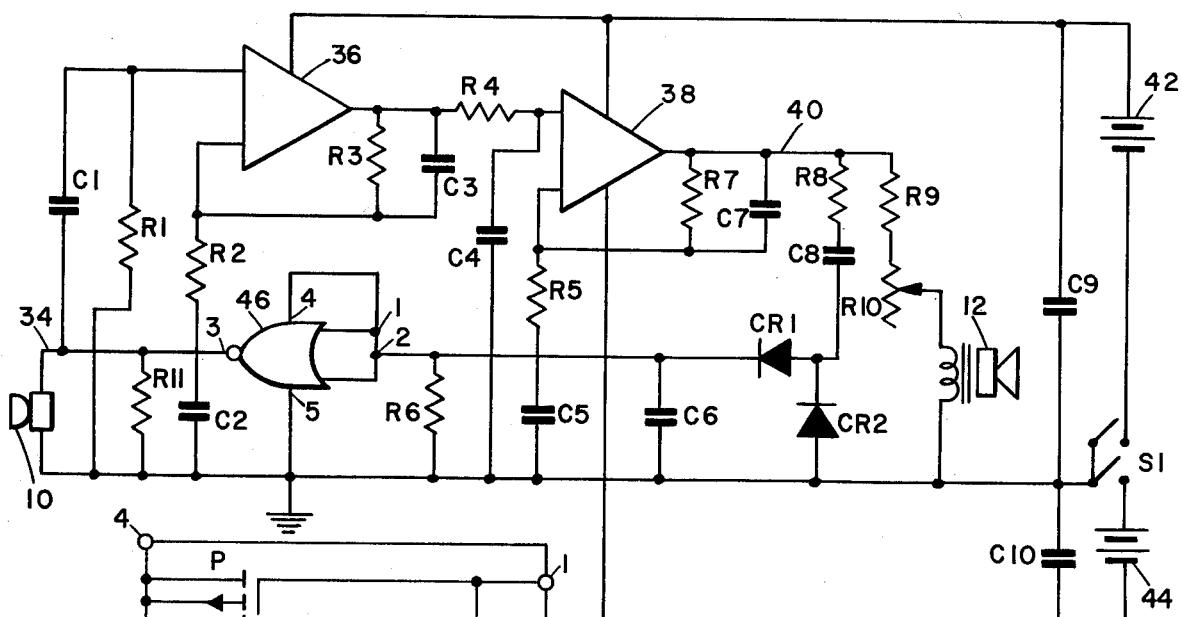
FIG. 2 is a schematic circuit diagram of the electronic circuit in a preferred embodiment of the hearing protector earmuff.

Referring to FIG. 2, the electrical circuit of each earmuff includes the microphone 10 and the speaker 12. A microphone output signal is produced by the microphone 10 at a microphone signal terminal connected to line 34 in response to sound waves received by the microphone 10. The other terminal of the microphone 10 defines circuit ground. Capacitor C1 is a coupling capacitor and resistor R1 is a biasing resistor.

The microphone output signal on line 34 is amplified by amplifiers 36 and 38. The gain of amplifier 36 is determined by the ratio of resistance R3 to resistance R2 and the gain of amplifier 38 is determined by the ratio of resistance R7 to resistance R5.

The microphone output signal is filtered by low frequency roll-off filters R2-C2 and R5-C5 and by high frequency roll-off filters R3-C3 and R7-C7. Additional filtering of high frequencies is provided by a filter R4-C4. These filters define the limits of the predetermined audio frequency range of the amplified and filtered signal provided to the speaker 12.

The amplified and filtered signal is produced on line 40 and provided to the speaker 12 through resistors R9 and R10. Resistor R10 is a variable resistor for enabling the volume of the sound produced from the speaker 12 to be manually adjusted.

Capacitors C9 and C10 keep the amplifier circuits from oscillating at high frequencies when the impedence of the batteries increases.

A bleeder resistor R11 is connected between line 34 and circuit ground to provide a DC path for eliminating transients in the received signal on line 34 from the microphone 10.

A switch S1 is provided for turning the earmuff circuit on or off.

The amplified and filtered signal on line 40 is also processed through a control circuit, which includes a CMOS integrated circuit 46, resistors R6 and R8, capacitors C6 and C8, and diodes CR1 and CR2. The output of the CMOS integrated circuit 46 is connected to line 34, on which the received signal is produced from the microphone 10. The CMOS integrated circuit 46 is shown in detail in FIG. 3.

Figure 3:
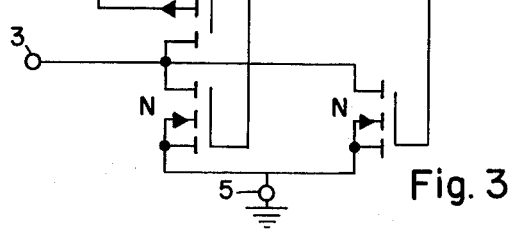
FIG. 3 is a schematic circuit diagram of the CMOS integrated circuit as it is connected for use in the electronic circuit of FIG. 2.

The CMOS integrated circuit 46 is constructed for normal use as a NOR gate. The CMOS integrated circuit 46 includes two input terminals 1 and 2 which are respectively connected to the gates of two series connected P channel FET's and two parallel connected N channel FET's as shown in FIG. 3. An output terminal 3 is connected in common to the drains of the two N channel FET's. A common voltage supply terminal 4 is connected to the sources of the P channel FET's; and a common ground terminal 5 is connected to the sources of the N channel FET's.

As shown in FIGS. 2 and 3 the input terminals 1 and 2 are connected to the voltage supply terminal 4, thereby effectively eliminating the P channel FET's from the circuit. It is seen that the two N channel FET's have their gates coupled in common from terminals 1 and 2 to the output of the amplifier 38, and their drains coupled in common from terminal 3 to the output of the microphone 10 on line 34. The NET channel FET's are connected to operate near their conduction threshold so as to present a variable resistance path to circuit ground for the output signal on line 34 from the microphone 10.

Diodes CR1 and CR2 and capacitor C6 form a voltage doubler circuit to which the amplified and filtered signal from line 40 is coupled via the capacitor C8 and the resistor R8. The voltage doubler circuit is connected to the gate terminals of the N channel FET's in the CMOS integrated circuit 46. The resistance of the resistor R8 determines the time of response of the control circuit to an increase in the level of the signal on line 40; with a higher resistance resulting in a slower response.

The capacitor C6 charges as the level of the amplified and filtered signal on line 40 increases. As the capacitor C6 continues to be charged, the resistance presented by the NOR gate N channel FET's in the CMOS integrated circuit 46 to the microphone output signal on line 34 decreases, which in effect presents a lower resistance path to ground to the output signal on line 34 from the microphone 10. Accordingly the output of the microphone 10 is effectively grounded when the signal produced on line 40 increases sufficiently to cause the voltage sensitive variable resistance element 46 to present a low resistance to the microphone output signal on line 34.

Resistor R6 discharges the capacitor C6 as the signal on line 40 decreases. When the signal on line 40 is at its lowest level the N channel FET's in the CMOS integrated circuit 46 presents their maximum resistance to the microphone output signal on line 34. The resistance of the resistor R6 determines the time in which the control circuit responds to a decrease in the level of the signal on line 40 to again present a high resistance path to ground for the microphone output signal on line 34.

In effect the voltage sensitive variable resistance circuit 46 attenuates the microphone output signal on line 34 in proportion to the level of the amplified and filtered signal on line 40.

Having described my invention, I now claim:

1. A hearing protector comprising an earmuff which comprises:
    a microphone for receiving sound waves and producing a microphone output signal in response thereto, wherein the microphone includes a signal terminal for providing said microphone output signal and a ground terminal for defining circuit ground;
    amplifier means for amplifying said microphone output signal;
    filter means for filtering said microphone output signal to reduce the amplitude of frequency components outside of a predetermined audio frequency range;
    speaker means for producing sound waves in response to said amplified and filtered signal; and
    control means responsive to said amplified and filtered signal for automatically limiting the volume of said sound waves produced by the speaker when the level of said amplified and filtered signal increases;
    wherein the improvement comprises
    the control means including a voltage sensitive variable resistance element coupled to the output of the amplifier means for sensing the level of said amplified and filtered signal and having an output coupled to the microphone output for reducing the level of said microphone output signal when the level of said amplified and filtered signal increases.

2. A hearing protector according to claim 1 wherein the voltage sensitive variable resistance element is a CMOS integrated circuit constructed for normal use as a NOR gate, but which is connected with its P channel FET's effectively eliminated from the circuit and its N channel FET's having their gates coupled in common to the output of the amplifier and their drains coupled in common to the microphone output, wherein the N channel FET's are connected to operate near their conduction threshold so as to present a variable resistance path to said circuit ground for said output signal from the microphone, said variable resistance decreasing as the level of said amplified and filtered signal increases.

3. A hearing protector according to claim 1, wherein the control means further includes
    a voltage doubler circuit coupled between the output of the amplifier means and the input of the voltage sensitive variable resistance element,
    the voltage doubler circuit including a first capacitance for charging as said amplified and filtered signal increases;
    a first resistance connected between the voltage doubler circuit and the output of the amplifier means for determining the time in which the voltage sensitive variable resistance element responds to an increase in the level of said amplified and filtered signal; and a second resistance connected to the first capacitance for discharging the first capacitance as said amplified and filtered signal decreases, and for determining the time in which the voltage sensitive variabe resistance element responds to said decrease to cease said reduction of said microphone output signal level.

4. A hearing protector according to claim 3, wherein the voltage sensitive variable resistance element is a CMOS integrated circuit constructed for normal use as a NOR gate, but which is connected with its P channel FET's effectively eliminated from the circuit and its N channel FET's having their gates coupled in common to the output of the amplifier and their drains coupled in common to the microphone output, wherein the N channel FET's are connected to operate near their conduction threshold so as to present a variable resistance path to said circuit ground for said output signal from the microphone, said variable resistance decreasing as the level of said amplified and filtered signal increases.

* * * * *